(12) United States Patent
Orban et al.

(10) Patent No.: US 12,418,166 B1
(45) Date of Patent: Sep. 16, 2025

(54) MODULAR POWER-LIMITED NETWORK PROTECTION SYSTEM WITH INTEGRATED CONTROL CIRCUITRY

(71) Applicant: A.O. International II Inc, Stafford, TX (US)

(72) Inventors: Andre Orban, Sugar Land, TX (US); Daniel Maurice Lerner, Missouri City, TX (US)

(73) Assignee: A.O. International II, Inc., Stafford, TX (US)

( * ) Notice: Subject to any disclaimer, the term of this patent is extended or adjusted under 35 U.S.C. 154(b) by 0 days.

(21) Appl. No.: 18/943,463

(22) Filed: Nov. 11, 2024

(51) Int. Cl.
*H02H 3/10* (2006.01)
*H02H 1/00* (2006.01)

(52) U.S. Cl.
CPC ............ *H02H 3/10* (2013.01); *H02H 1/0007* (2013.01)

(58) Field of Classification Search
CPC ........ E21B 17/003; E21B 23/12; E21B 34/16; E21B 47/12; E21B 47/125; E21B 41/00; E21B 44/00; E21B 47/024; E21B 47/13; G05D 23/1905; G05D 23/20; H02H 3/10; H02H 1/0007; H02H 9/045; F42B 3/182; F42D 1/05
See application file for complete search history.

(56) References Cited

U.S. PATENT DOCUMENTS

| | | | | |
|---|---|---|---|---|
| 2017/0331280 | A1* | 11/2017 | Koenecke | H02H 3/10 |
| 2020/0109624 | A1* | 4/2020 | Parasram | H04B 1/38 |
| 2020/0318462 | A1* | 10/2020 | Ross | E21B 47/13 |
| 2021/0277774 | A1* | 9/2021 | Parasram | H04L 63/062 |
| 2022/0393461 | A1* | 12/2022 | Pihl | E21B 47/00 |

* cited by examiner

*Primary Examiner* — Danny Nguyen
*Assistant Examiner* — Nicolas Bellido
(74) *Attorney, Agent, or Firm* — ePatentManager.com; Guerry L. Grune

(57) ABSTRACT

Disclosed is a power-limited network protection system designed to enhance the reliability and stability of networks with multiple remote nodes. This system employs a combination of power supplies and communication transceivers to modulate energy and data transmission, ensuring efficient operation across extensive distances. Each remote node is equipped with an advanced protection device featuring a controllable disconnect switch and monitoring capabilities for current and voltage. This configuration enables independent operation of nodes while preventing cascading failures. By dynamically managing power distribution and implementing fail-safe mechanisms, the system mitigates risks associated with overloads and shorts, ultimately enhancing network resilience. This invention is particularly beneficial in environments prone to electrical disruptions, ensuring continued functionality and minimizing operational downtime.

13 Claims, 3 Drawing Sheets

MODULAR POWER-LIMITED NETWORK PROTECTION SYSTEM WITH INTEGRATED CONTROL CIRCUITRY

The present disclosure relates to power limited network protection devices, specifically designed for environments where power distribution is constrained by the capabilities of the power supply and the operational conditions of the network, such as in submersible or wet environments.

These devices are critical in enhancing the reliability and operational efficiency of remote node networks and are normally dynamic devices that require movement in a remote location, particularly in applications where electrical shorts, overloads, and potential faults can compromise the overall system. These power limited networks are particularly important for off-shore oil and gas recovery operations and where other remote working environments exist (both on and remote from the Earth).

BACKGROUND

In various industrial applications, such as oil and gas drilling, power limited networks are employed to control and monitor remote devices. These networks face significant challenges due to their dependency on continuous power supply, which can be adversely affected by electrical failures or degradation over time. Traditional solutions, such as fuses, often prove unreliable, leading to complete network failures in the event of a fault. Control of these networks downhole in remote locations when network failures occur often require the entire set of devices and networks to be located and brought back to the surface for repair or in many instances due to the cost of such operations, the network and devices are abandoned.

The need for improved reliability in power distribution has led to the development of devices that can monitor power consumption at each node and autonomously manage power distribution based on real-time conditions. These devices are essential to prevent catastrophic failures and ensure uninterrupted operation of critical systems.

In the case of offshore oil and gas exploration operations and platforms, single DC lines from the wellhead to power all devices in the well (as well as communications) along a single wire is often unreliable. Often one important issue with networks is that they lack reliability. For instance when a single device experiences a short or other electrical fault the entire network is compromised and often shuts down completely. The fact that this can and often occurs due to one faulty device along the network is unacceptable.

To alleviate this issue with the networks and systems electronic circuit breakers can be inserted into each device separately as a first level of protection. This allows for protection of the network from any single device shorting out. In this manner the balance of the devices would continue to operate. Here, the network continues to operate albeit with one or more faulty devices.

In some cases, others have tried using fuses on each unit or downhole device that unfortunately have proven to actually be the most unreliable components that can be rendered unfunctional when everything else in the network is fully operational. Therefore the conventional mechanical fuses have been shown to be not satisfactory. These are primarily thermo-mechanical fuses which are very unreliable in downhole and other remote locations. The term for these connections are "nuisance connections", or "nuisance trips" and/or "nuisance disconnects" and basically are the terminology used to describe what occurs when circuit breakers are used that have an auto reset switch or set of relays and/or controls that can protect certain devices on one or more networks from drawing too much power.

However, if two or more devices on the network have some internal electrical failure, then the trip characteristics of the individual circuit breakers will never be reached because the power from the network is divided and cannot reach the threshold of the current of the circuit breakers on each device. Therefore the available power will be divided between the first and the second device and the circuit breaker will not trip (default is to open). Here, only half the power of the setpoint will trigger a circuit breaker disconnect action.

One solution to these common and costly (time and money) issues is to place different turn on time delays on each device on the network. In this instance it is possible to provide a specially developed circuit breaker which delays turning on the device in the network by a different amount of time. Here, when the power is supplied to the network, the power will be sent to each device in a timed sequence. In this manner when a device that has an internal problem (that can cause malfunction or no functionality) is requested to go "on line" and overloads the network power, the circuit breaker "pops" to compensate for the overload, however, the balance of the devices are still connected to the line and staggered so that at different times these different devices are connected to the line so that each device is measured as the power is turned on to each device to determine if the device(s) have an overload problem that exist on that particular node of the network. This issue is akin to a Christmas tree with lights that all go off (or out) if one light is faulty. In the network of the present disclosure, if and when a device fails, the network is quite different. While a Christmas tree light network is a series network, the network described herein is a parallel network. The network comprises many devices that are connected to one common power bus. The circuit breakers for each device are networks with a timer/clock that initiate detection of the faults before and/or during the initial power up of each device in the network. This allows for control of the timing of the power to the devices with a timing controller that is unique for the system. This requires an ability to provide each circuit breaker for the network to be preprogrammed for different startup times than all the other circuit breakers on the network.

This allows for this variant of the network system of the present disclosure to be defined and controlled networks that is the basis for some small telecom networks that can operate in a similar manner. For some downhole operations such as a petrochemical extraction well, there may be only ten (10) or so nodes required. Here all of the circuit breakers attached to the network can have different kinds of time delays.

In order to achieve the proper startup and operational conditions requires specific circuitry that may or may not require any communications (signals or other techniques) between the devices in order for the network to connect and disconnect any faulty devices. This can be accomplished by simple control of time and power load. So in this and other similar scenarios, there also could be (theoretically) unlimited nodes that as provided herein will result in avoiding the "cascading black-out phenomena" but allow for the same or similar functionality of each and every node in and along the network.

In order to clarify and simplify the present disclosure the following glossary of terms for FIGS. 1 and 2 is provided;

Glossary of Terms

100—Power limited network with protection devices

110—Network power and communications interface (a combination of 115+120+125+130)

115—Network Power Supply that supplies power in any form (AC or DC) using various voltage, frequencies, currents, etc. This can modulate all of the power supplied.

120—Network communications transceiver that provides modulating power with the communications signals and sends and receives time delays in some format. This can operate similarly to a telegraph. The transceiver can provide radio and/or other signals over wires to the next station. It can allow for surging power or modulating power and as a transceiver can operate in both directions as a receiver and a transmitter. This can be controlled by an operator or by the circuit remotely and the amplification of the signal either way can also be performed in both directions. This equipment can be used with or without repeaters.

125—Common ground point for earthings—could also be the pipe—it is a ground to ensure there is a reference point and part of the power return. The objective for this common grounding is to be able to use a single wireline or at most two wire lines one to modulate the signal and one to have a common reference for moving the power and signal. An earthing wire could be the return (like in a telegraph system). If the network loses a lot of power and signals, then it is wise to use two wires. In one instance, the use of electromagnetic signals are independent of the ground and carry energy with it. In most instances, however, this only allows for one way transmission.

130—Communications transceiver path that—sends, receives, controls and monitors communications signals. This functions as the command control and monitoring of the network (via local area networks including ethernet, satellite and radio communications, etc.)

140—Remote devices in the network. Here the functionality of the system and all the remote items allow for controlling the network remotely and provide—command control and monitoring capabilities.

145—Network connection cable that combines power and communications signals along one or more wires/cables. The dashes provided indicate some unknown lengths that could be up to hundreds or thousands of miles. The goal for the network of the present disclosure is to go down at least one hundred (100) feet.

150—First network remote node

160—Second network remote node

170—Third network remote node

151, 161, 171—T connector(s) (ultra waterproof connections which is a module with glass to metal seals and filled with silicon jelly) that provide distribution signals and power from the network connection cable [145] reliably and irrevocably. The power cannot be interrupted by any single node. In this manner the network is defect free so that the system and/or network cannot fail or be interrupted (underwater in many cases).

152, 162, 172—Remote node network protection device(s)

153, 163, 173—Network connection cable branch(s)—power and signal input to the remote node protection device(s)

154, 164, 174—Remote node operating device(s)

155, 165, 175—Connection path(s) for power and signal output to the remote node network protection device(s)

156, 166, 176—Remote node common ground point(s)

200—Functional circuit with protection components

220—Controllable disconnect switch

221—Connection from control input of the controllable disconnect switch [220] to the logic and control module (250)

230—Current measurement device to measure the current drawn from the network connection cable (145)

240—Network connection cable voltage monitoring device

250—Logic and control circuitry module for the functional circuit

252—Power input for 250—logic and control module for the functional circuit [200]

254—Connection of the logic and control circuitry module to the common ground

SUMMARY

The present disclosure describes a power-limited network protection system designed for environments with potentially cascading failures more specifically cascading lock out phenomena which habitually affects power and communications networks. This power limited network power and communications device protection system allows for the integration of multiple remote nodes, each capable of independent operation so that overall network stability is maintained. By employing advanced monitoring and control mechanisms, the system effectively mitigates risks associated with overloads, shorts, and component degradation, thereby preventing cascading blackouts. More specifically the present disclosure provides for; one or more power-limited network protection devices that operate on a remote node, comprising:

(i) a controllable disconnect control device/element configured to manage power flow to one or more remote node operating devices;

(ii) a current control and measurement device that controls and monitors current drawn from at least one network connection cable;

(iii) a voltage control and monitoring device that controls and assesses voltage levels within said remote node operating devices; and (iv) at least one logic and control circuitry module that integrates the current control and measurement device, the voltage control and monitoring device, and the controllable disconnect switch thereby facilitating automated control that operates according to preprogrammed operational parameters.

Here, the one or more power-limited network protection devices include a controllable disconnect control device/element that is any one of a toggle, gate, and/or switch.

In one embodiment these devices further comprise one or more common ground point(s) that provide a reference for power return and signal integrity.

(iv) at least one logic and control circuitry module that integrates the current control and measurement device, the voltage control and monitoring device, and the controllable disconnect switch thereby facilitating automated control that operates according to preprogrammed operational parameters.

Here, the one or more power-limited network protection devices include a controllable disconnect control device/element that is any one of a toggle, gate, and/or switch.

In one embodiment these devices further comprise one or more common ground point(s) that provide a reference for power return and signal integrity.

In addition to the network protection devices, a network connection cable configured to carry power and communication signals exists, wherein, the cable combines at least one power line and one communication line, allowing for simultaneous data transmission and power delivery to multiple remote nodes.

Also, the one or more network connection cable(s) is configured for various topologies including parallel branches, star, series branching, and ring configurations.

In addition, there exists one or more common ground point(s) that protect and ground each remote node protection device, wherein the common ground point(s) are selected from a group consisting of: earth, conductive metal structures, and one or more network connection cable(s).

In another embodiment, the controllable disconnect switch is comprised of one of a relay, transistor, MOSFET, or IGBT.

Here the network power supply operates within a voltage range of 5-1000V and enables powered on and off operation of remote node protection devices.

In addition in another embodiment, the remote node protection devices further include a current monitoring device that detects overcurrent conditions in respective remote node operating devices.

Also it is possible to provide each remote node protection device includes a control module that executes an operational protocol to manage a turn-on/turn-off sequence and monitors power demand required by connected remote node operating devices.

In yet another embodiment, the network communications transceiver provides an ability for protocol conversion and data formatting so that communication between disparate systems is achieved.

In a further embodiment, the power limited network protection device(s) is configured to operate continuously with minimal power consumption from a power limited network.

Here the remote node protection devices are isolated from fault conditions at any single individual remote node operating device in order to eliminate conditions that affect overall network operations and allow for robust fail proof networks.

In another embodiment a power limited network that protects networked moveable devices is provided comprising:
(i) a network power supply configured to provide electrical power to a remote devices network;
(ii) a network communications transceiver facilitating bi-directional communication between the network power supply and remote node operating devices;
(iii) a plurality of remote node protection devices connected to a set of remote node operating devices via a network connection cable, wherein each remote node protection device independently monitors power demand of respective remote node operating devices; and
(iv) a controllable disconnect switch within each remote node protection device that connects and disconnects power to the respective remote node operating device based on monitored power demand for both the network and remote node device(s).

In yet another embedment, a power-limited network exists, comprising:
(i) a network power supply that provides electrical power in various formats (AC or DC) to a plurality of remote nodes;
(ii) a network communications transceiver that modulates power to enable communication signals for bidirectional data transfer;
(iii) at least one remote node protection device connected to each remote node operating device to ensure independent monitor, control, and operation of each remote note protection device.

In some cases the one or more network connection cables are configured to extend for distances ranging from one hundred (100) feet to 10,000 miles and allow for remote deployment scenarios.

In another embodiment case this further comprises:
one or more common ground point(s) or locations for all remote nodes that provides a stable reference for both power and signal integrity.

In addition, the present disclosure provides a method for operating a power-limited network, comprising the steps of:
(i) initializing power from a power limited network power supply to remote nodes;
(ii) monitoring voltage output to provide operational requirements for each remote node;
(ii) measuring current drawn by each remote node operating device that also detects overload conditions;
(iii) selectively activating and/or deactivating a controllable disconnect switch for each remote node as required based upon measured and controlled current and voltage.

The method can further include the step of implementing a time delay prior to activating multiple remote node operating devices to manage initial power surge demands.

When a remote node operating device exceeds a predetermined current threshold, automatic disconnection of power to that device to prevent network overloading is achieved.

The method further ensures power limited network stability, comprising: periodically assessing an operational status of each remote node; utilizing data from current and voltage monitoring devices that adjust power delivery dynamically; executing a fail-safe procedure to isolate malfunctioning nodes located anywhere in said power limited network and maintaining overall network functionality.

A method for operating power limited network protection devices, comprising:
(i) initializing a network power supply to provide power to the remote devices network;
(ii) monitoring the voltage output from the network power supply to ensure it meets the minimum operating voltage for remote node operating devices;
(iii) implementing a delay to prevent simultaneous activation of multiple remote node operating devices, thereby limiting initial power surge demands;
(iv) selectively activating remote node operating devices using a controllable disconnect switch based on real-time power demand and operational conditions.

This method provides a step of measuring current drawn by each mote node operating device that detects overcurrent conditions.

A further step includes the step of monitoring voltage output includes checking for voltage drops below a predetermined threshold, followed by deactivating affected remote node operating devices as needed.

In addition the step of maintaining one or more common ground points and/or locations that facilitate effective power and signal return paths to control and monitor remote node operating devices is provided which includes the step of conducting periodic assessments of power limited networks that possess potential faults and performing corrective actions that isolate faulty remote node operating devices attached to the power limited networks.

DETAILED DESCRIPTION

Figure 1:
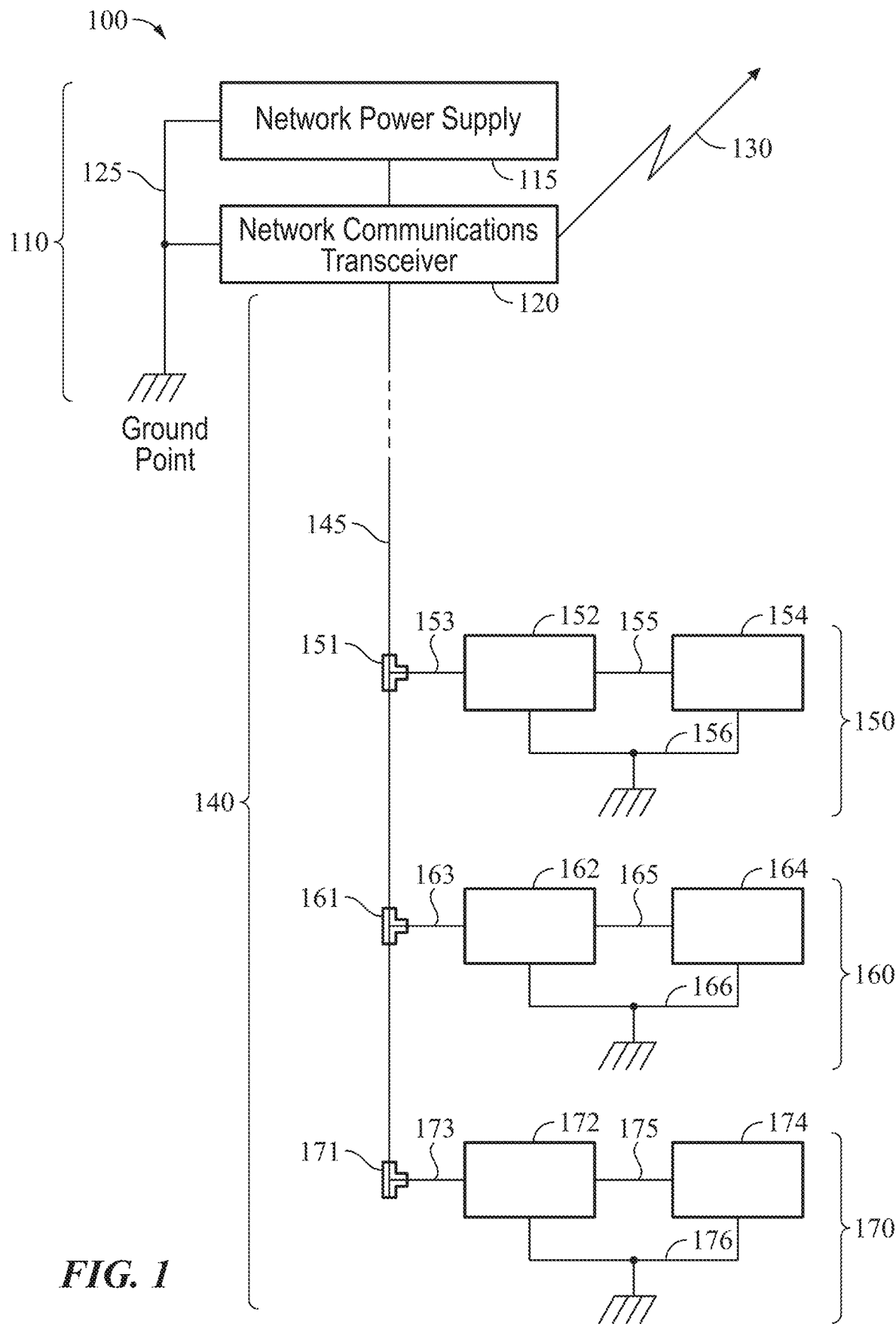
FIG. 1 illustrates a system diagram for the overall power limited network with protection devices.

The issue for all energized and controlled networks is that there is some ultimate amount of available power that is limited by the supply source. In this case the network power and communications interface [110] which is in a wet tree (at the top of the well it is fastened to the earth with a valve to control—typically a "Christmas tree—as opposed to a dry tree on dry land versus a wet tree that is submersed) with a transmission medium for the power and that has some kind of electrical loss—therefore limited power distribution and limited size for the network connection cable (145) and length as needed for the applications There is a purpose for the parallel configuration which is that there are many less components for power distribution in a parallel network than there is in a series network leading better reliability.

The reason for the protection for these devices to further improve the reliability of the connections to the parallel network. In many instances these networks without this system will fail completely due to a single fault that can occur at any location at any time. To avoid this predicament, it is desirable to employ the present network system. If any node fails in such a way that it overloads the network power the entire network collapses and cannot be brought back on-line or maybe ever—therefore requiring replacement of the entire drill string.

In some cases, fuses have been employed in these and other applications but the reliability of fuses is suspect and has been proven over time to be the least reliable component in the entire network node. In this case an individual node will cease to operate—but the other nodes will continue to operate. The worst problem with uses is that if you are operating the network nodes close to the rating of the fuses you may have accidental failure of the fuse and you have long term degradation of the fuse because there is stress on the entire operating cycle and the fuses fail prematurely. It has been attempted to use fuses with more robust rating than the network can manage—which is OK until there is a complete overload that circumvents the robust fuse. The penny in the fuse box analogy works until the network is overloaded and entire circuitry goes out and the house burns down.

It is desirable that this entire device (210) utilizes the lowest amount of power possible from the network power supply (115) because this device is continuously in the 'On' position and is taking power away from the power limited network.

DETAILED DESCRIPTION

As the network system powers up there is potential to have overloads and shorts of the first, second, and third remote node operating devices (154, 164, 174). The present disclosure addresses the need to alleviate issues which include problems from electrical shorts, overloads, and partial circuitry failures that may draw a fraction of the available network power continuously (i.e. electrical leakage). For the present disclosure, the power limited network is protected from these failure types by adding first, second, and third remote node network protection devices (152, 162, 172). Also, there may be long term degradation of the network connection cable (145) that further reduces or possibly interrupts delivered power.

FIG. 1 provides a system diagram for the overall power limited network with protection devices [100] beginning with the network power and communications interface (110) that provides in this electrical power for the power limited network and bi-directional communications to command control and monitor the remote devices network (140). The network power communications interface (110) comprises the network power supply (115) a network communications transceiver (120) with a common ground point (125) and a bidirectional communications transceiver path [130] external to the power limited network with protection devices (100). Where the path can be wired or wireless provides command control and monitoring of the network. In this case there are several possible communications techniques including use of electrical energy along wires as well as radio, optical, and electro-optical transmissions. The network power supply (115) supplies power to remote devices network (140) in order to power the overall limited power network. The power can be supplied using various voltages, currents, and frequencies (including alternative and direct current). The power passes through the network communications transceiver (120) which modulates the power and provides signals to command and control the remote devices network (140) and receives modulations from the remote devices network (140) to monitor its operation. The network communications transceiver (120) provides translation between the remote devices network (140) and the communications transceiver path (130) because the signal modulations are completely different between the communications transceiver path and the physical modulation required by the remote devices network (140). This is basically a protocol conversion and data formatting capability that is needed between disparate systems and use by an external operator for example M to M (machine to machine) and/or HMI (human machine interface).

Referring now specifically to the remote devices network (140) a network connection cable (145) provides power with signal modulations to all remote nodes including the first network remote node [150] second network remote node [160] and third network remote node [170] shown in this diagram. The network connection cable (145) is of an arbitrary (generally on the range of 100 feet to as much as 10,000 miles). Each node in the remote devices network 140) is connected to the network connection cable (145) through "T" connectors or splitters (151, 161, 171) in order to provide the needed power and signal modulations to each network remote node (150, 160, 170), where the first T-connector [151] provides to the first network remote node [150], the second T-connector [161] provides to the second network remote node [160] and the third T-connector [171] provides to the third network remote node [170]. The topology of the network connection cable (145) may include parallel branches as shown, a star, branching and ring type configurations as well as any combination thereof.

More specifically, for the remote node network protection devices (152, 162, 172) that are connected to the "T" connectors or splitters (151, 161, 171) via a first, second, and third network connection cable branches (153, 163, 173) of the network connection cable (145) to remote node network protection devices (152, 162, 172). These "T" connectors or splitters must provide both insulative and water or water proof properties to ensure network integrity which require specific engineered materials and adhesives and gels to accomplish the best possible connectivity and also minimize leakage.

The remote node network protection devices (152, 162, 172) are independently monitoring the power demand for each of the remote node operating devices (154, 164, 174). In this manner power can be connected and disconnected to the remote node operating devices (154, 164, 174) to ensure that each remote node operating device operates within a specified range of power consumption. These remote node network protection devices [152, 162, 172] connect the power and signals to each remote node operating device (154, 164, 174) via the first, second, and third connection paths (155, 165, 175). Each network remote node (150, 160, 170) is connected via first, second, and third remote node common ground points (156, 166, 176) that include a common ground return(s). These ground return(s) are physical structures such as the earth, piping, conductive metal structures, and/or the network connection cable (145) itself. This allows for a return path for the power and signals for the network power and communications interface (110) portion of the network.

Figure 2:
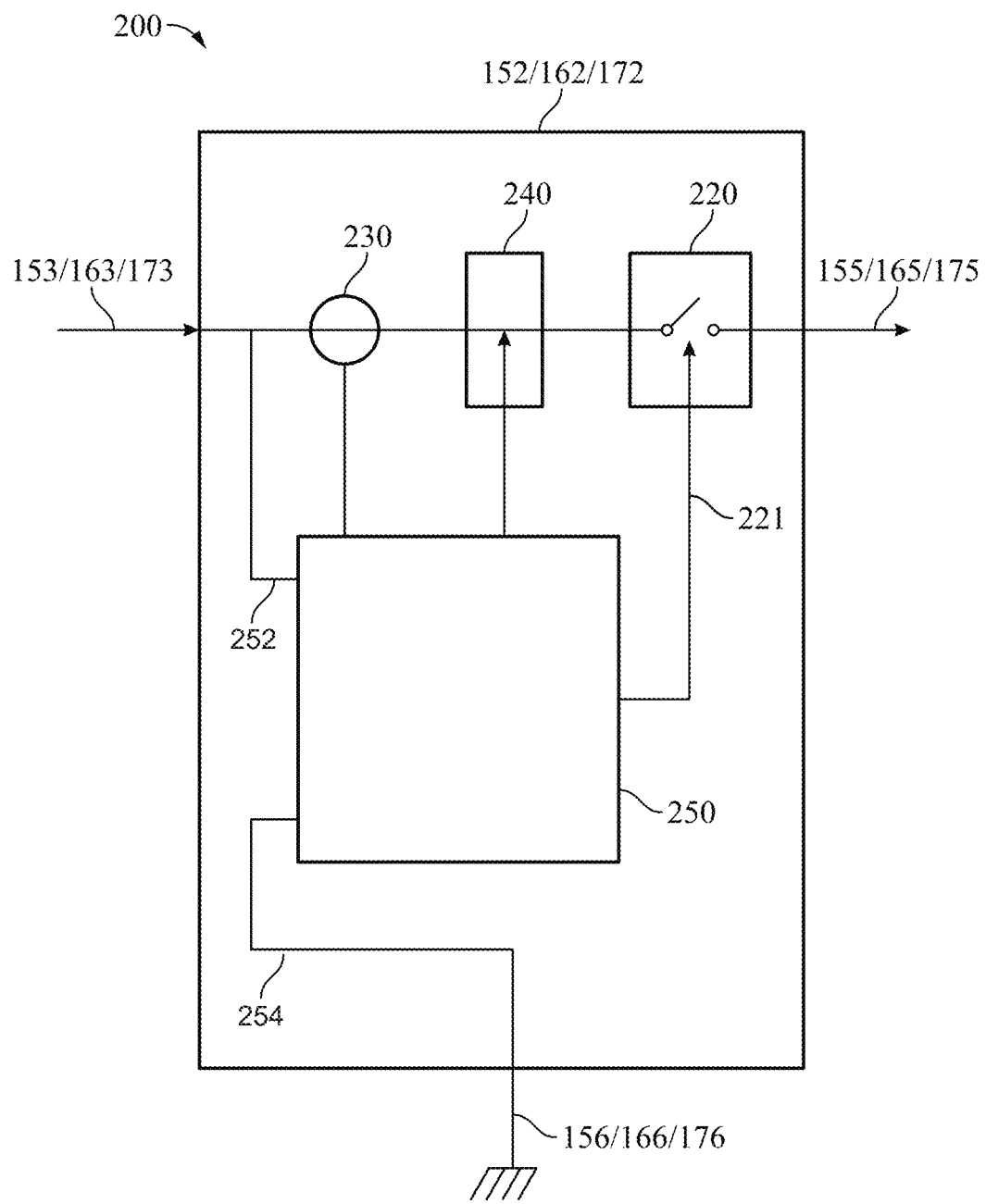
FIG. 2 depicts a schematic diagram of a functional circuit with protection components showing an embodiment of one of the remote node network protection devices and their connections.

FIG. 2 is a schematic diagram of a functional circuit with protection components (200) showing an embodiment of one of the remote node network protection devices (152, 162, 172) and their connections. Here a single network connection cable branch (selected from 153, 163, 173) is a pathway that carries the power and signal modulation to the remote node network protection device (selected from 152, 162, 172). This is illustrated as a controllable disconnect switch (220) that exists within the remote node network protection device (152, 162, 172) and can be one of several components including relays, transistors, MOSFETs, IGBTs, etc. that allows for turning on and off the power and/or communications signals between the network and the operating device by utilizing the controllable disconnect switch (220).

It is therefore possible to monitor the current with the current measurement device (230). Here, the remote node network protection device (152, 162, 172) is controlled by the logic and control module (250) which includes digital and/or analog circuitry as well as transistors including Therefore, there is no power output (shown as 155/165/175 which is the circuit connection path to power one or more operating devices). A delay time for the power supplies to "settle" (settling is defined as the time delay for the power supply to reach an actionable level known as a "no action time delay") allows the measurement circuits to initialize and proceed to define the necessary initial conditions. These initial conditions include providing the instructions for the logic and control module (250) to be ready to be operate, the current measurement device (230) to measure zero current, network connection cable voltage monitoring device (240) to accurately measure the voltage and utilizes a controllable disconnect switch message path (221) to provide the controllable disconnect switch (220) with an open (or "off") command to enable this condition.

Once the initial condition is established, the voltage is monitored with the network connection cable voltage monitoring device (240) until the minimum operating voltage requirement for remote node operating devices (154, 164, 174) is met. Next, an optional random or programmed time delay may be started here so that the operating devices are not all powered on simultaneously. This distributes and limits the initial "turn on" power surge demand of the remote node operating devices (154, 164, 174).

When the controllable disconnect switch (220) is closed it allows for power to be sent to selective remote node operating devices (any single one or any group of them shown—154, 164, 174).

Figure 3:
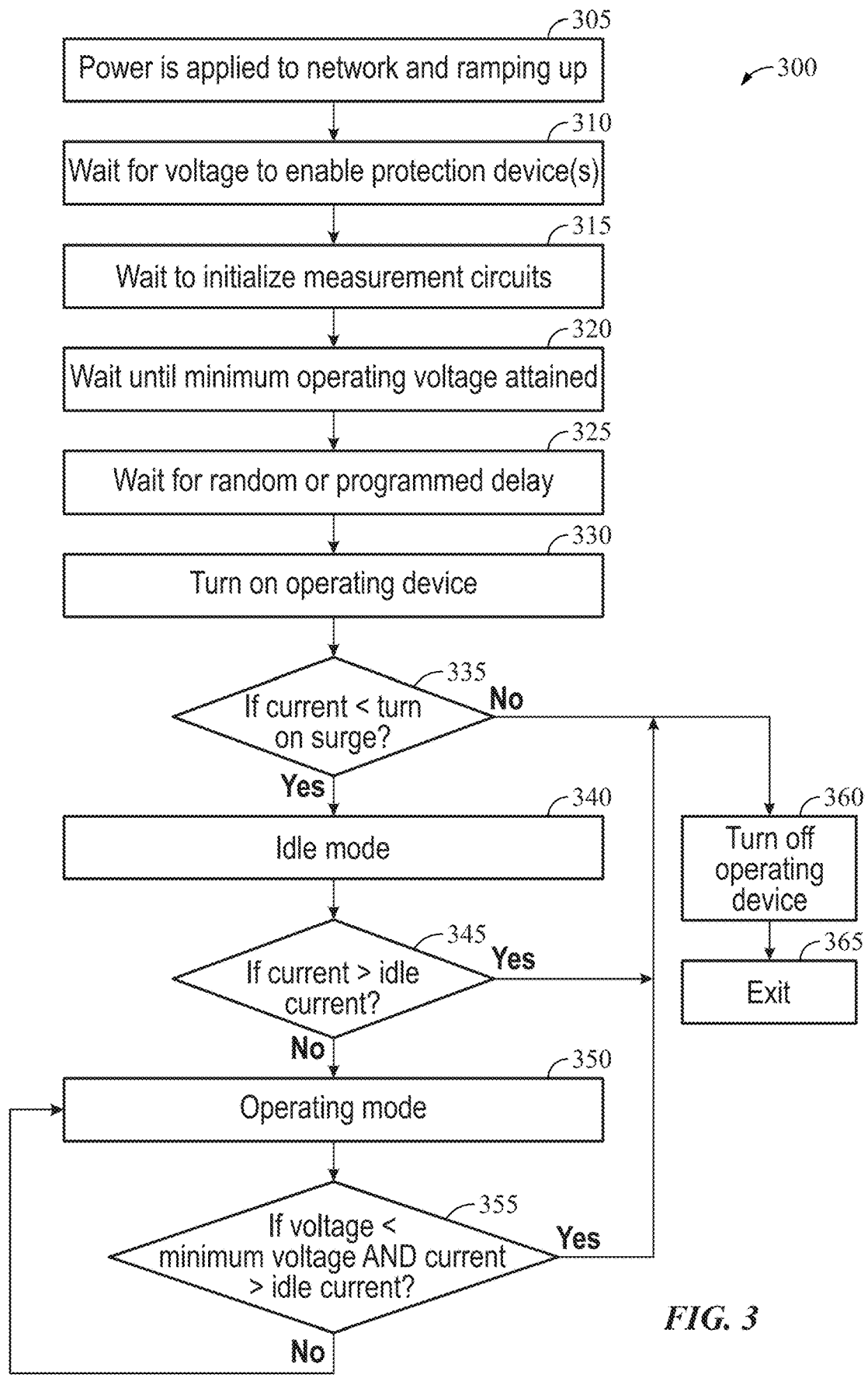
FIG. 3 provides a flow diagram which describes two basic start-up techniques and a single operational scenario.

FIG. 3 is a flow diagram (300) which describes two basic start-up techniques and a single operational scenario (cases).

Here power is applied to the network and ramping up (305) followed by waiting for voltage to enable protection devices (310). Next it is important to wait to initialize measurement circuits (315). This includes the need to wait until the minimum operating voltage is obtained (320). In addition, there is a need to wait for random or programmed delay (325). Now it is proper to begin operation by turning on the operating device (330). If the current is less than the "turn on" surge (335), then proceed to the idle mode (340). When in idle mode, if the current is greater than or equal to the "turn on" surge, operation requires that you turn off the operating device (360). If the current is greater than the idle mode current (345) then operation proceeds to turn off the operating device (360). If the current is less than the idle mode current, proceed to the (315). This includes the need to wait until the minimum operating voltage is obtained (320). In addition, there is a need to wait for random or programmed delay (325). Now it is proper to begin operation by turning on the operating device (330). If the current is less than the "turn on" surge (335), then proceed to the idle mode (340). When in idle mode, if the current is greater than or equal to the "turn on" surge, operation requires that you turn off the operating device (360). If the current is greater than the idle mode current (345) then operation proceeds to turn off the operating device (360). If the current is less than the idle mode current, proceed to the operating mode (350). When in operating mode, if the combination of the voltage is less than the minimum voltage, and the current is greater than the idle current (355), the overall operation requires the remote node operating devices (154, 164, 174) to be turned off (360). If this is not true, then the network remains in operating mode [350]. If the devices are turned off due to any of the three "default positions," it is necessary to keep the operating devices in the off mode until the entire network system is reset (365).

In case (I) once the controllable disconnect switch [220] is turned on, the current will be monitored by the current measurement device (230) to detect over current. If the initial surge current exceeds some over current value, then the operating device is switched off by opening the controllable disconnect switch (220). This condition remains until the network power is turned off. This step allows for disconnection of an operating device which draws excessive current from the network. (shorting out—no longer in use). The device either gets replaced or eliminated (fail safe) or repaired (taken out of service to receive some maintenance action).

In case (II), which is optional, during start-up operations the current is monitored by the current measurement device (230) over some time period to ensure that the operating device current drops below some specified value or set point. This practice ensures the operating device is allowed to operate in idle condition. If the current does not drop below the specified minimum value, the operating device is disconnected and left in an "off" condition. This indicates the operating device possesses some initial operating defect and should be disconnected from the network to ensure proper continued network operation.

Now for case (III) which controls for continued operation of the network, the remote node operating devices (154, 164, 174) need at least two sensors for current and voltage—as well as at least one time measurement indicator and capability. In this case a combination switch that is used to accomplish two functions. It is vital to stop sending power and signals that allows for monitoring network voltage if the network voltage drops below an arbitrary set point. This requires checking to determine how much current the node operating device(s) is drawing. If the device is not drawing any current it ignores the fact that the voltage is dropping and as all circuit breakers are in parallel, it is necessary to determine which device is drawing more current than the allowable set point. The second function is to determine if the current and voltage is dropping simultaneously. For this function, a "kill function" is required to shut down the device. Here, the combination switch needs to be designed for both a continuous operational mode condition and a "kill switch" mode condition. In any case, if more than single device is in operation this network system still operates as long as the total current being pulled is sufficient in that the overall network voltage does not decrease below a certain set point.

This disclosure and claims presented below provides an overview of the invention and specific embodiments, but it is not intended to cover every possible variation or embodiment. The scope of the claims should be interpreted as encompassing at least the breadth explicitly claimed, and potentially broader, based on the legal interpretations and principles of patent law.

We claim:

1. One or more modular power-limited network protection devices that operate on a remote node, comprising:
   (i) a controllable disconnect control element configured to manage power flow to one or more remote node operating devices;
   (ii) a current control and measurement device that monitors and regulates current drawn from at least one network connection cable;
   (iii) a voltage control and monitoring device that assesses voltage levels within said remote node operating devices; and
   (iv) at least one logic and control circuitry module that integrates said current control and measurement device, said voltage control and monitoring device, and said controllable disconnect control element, thereby facilitating automated control that operates according to predefined operational parameters comprising at least one of a group comprising: a current threshold, and/or a timing parameter with current thresholds and voltage stabilization criteria that includes a network power supply configured to deliver power through said at least one network connection cable and a common ground point for electrical stability.

2. The one or more power-limited network protection devices of claim 1, wherein said controllable disconnect control element comprises at least one of: a toggle, gate, relay, transistor, MOSFET, or IGBT.

3. The one or more power-limited network protection devices of claim 1, further comprising a communication interface operating via RS-485 or CAN bus protocol to transmit diagnostic data from said remote node protection devices to a central monitoring station.

4. The network connection cable of claim 1, configured to carry power and communication signals, wherein: said cable combines at least one power line and one communication lines, wherein said at least one network connection cable is configured to carry power and communication signals using a combined power-and-data protocol.

5. The one or more power-limited network protection devices of claim 4, wherein said power limited network protection device(s) are configured to operate continuously with minimal power consumption from a power limited network, and wherein, said network communication cable combines power-and-data protocol to comply with IEEE 802.3af (Power over Ethernet) specifications.

6. The one or more power-limited network protection devices of claim 1, wherein said one or more network connection cable(s) is configured for various topologies including parallel branches, star, series branching, and ring configurations, and wherein said network connection cable supports simultaneous data transmission and power delivery to multiple remote nodes in a daisy-chain topology.

7. The one or more power-limited network protection devices of claim 1, further comprising one or more common ground point(s) that protect and ground each remote node protection device, wherein a network system further comprises a multi-layered protection protocol integrating real-time current monitoring with automated disconnect upon detecting overcurrent conditions exceeding 150% of rated capacity.

8. The one or more power-limited network protection devices of claim 7, wherein said controllable disconnect switch is comprising one of a relay, transistor, MOSFET, or IGBT, and wherein said logic and control circuitry module executes an operational protocol to:
   (i) manage a turn-on/turn-off sequence for connected devices;
   (ii) monitor power demand; and
   (iii) enforce dynamic load balancing across said network system.

9. The one or more power-limited network protection devices of claim 8, wherein each remote node protection device includes a control module that executes an operational protocol to manage a turn-on/turn-off sequence and monitors power demand required by connected remote node operating devices, and wherein, said dynamic load balancing is prioritized based on user-defined criticality rankings for connected devices.

10. The one or more power-limited network protection devices of claim 1, wherein said network power supply operates within a voltage range of 24-480V DC and enables powered on and off operation of remote node protection devices with galvanic isolation.

11. The one or more power-limited network protection devices of claim 1, wherein said remote node protection devices further include a current monitoring device that detects overcurrent conditions in respective remote node operating devices, and wherein each remote node protection device includes a fault detection circuit configured to isolate individual nodes during ground-fault events.

12. The one or more power-limited network protection devices of claim 11, wherein said remote node protection devices are isolated from fault conditions at any single individual remote node operating device in order to eliminate conditions that affect overall network operations and allow for robust fail proof networks, and wherein, said fault detection circuit further identifies arc-fault conditions that analyze high-frequency noise patterns in a power signal.

13. The one or more power-limited network protection devices of claim 1, wherein a network communications transceiver provides an ability for protocol conversion and data formatting so that communication between disparate systems is achieved, and wherein the system further comprises a thermal monitoring sensor configured to disconnect power upon detecting a temperature exceeding 85° C. at any remote node.

* * * * *